(12) United States Patent
Fest et al.

(10) Patent No.: US 7,777,188 B2
(45) Date of Patent: Aug. 17, 2010

(54) SENSOR SYSTEM AND SUPPORT STRUCTURE

(75) Inventors: Eric Fest, Tucson, AZ (US); Rex Kremer, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 667 days.

(21) Appl. No.: 11/679,490

(22) Filed: Feb. 27, 2007

(65) Prior Publication Data

US 2009/0212221 A1    Aug. 27, 2009

(51) Int. Cl.
    *G01J 5/02* (2006.01)
(52) U.S. Cl. ........................................ 250/353
(58) Field of Classification Search ............... 250/343
    See application file for complete search history.

(56) References Cited

U.S. PATENT DOCUMENTS

| | | | | |
|---|---|---|---|---|
| 3,864,567 A | * | 2/1975 | Bez | 250/232 |
| 4,672,206 A | * | 6/1987 | Suzuki et al. | 250/342 |
| 4,820,923 A | * | 4/1989 | Wellman | 250/352 |
| 5,181,145 A | * | 1/1993 | Eden | 359/859 |
| 5,214,438 A | * | 5/1993 | Brusgard et al. | 343/725 |
| 5,253,637 A | * | 10/1993 | Maiden | 126/696 |
| 5,400,169 A | * | 3/1995 | Eden | 359/208.1 |
| 6,295,034 B1 | * | 9/2001 | Brown et al. | 343/781 CA |
| 2007/0096025 A1 | | 5/2007 | Jenkins | |

OTHER PUBLICATIONS

Moreira et al. "Strut Cross Section for Minimizing Noise Temperature in Reflector Antennas" 1994, IEEE, pp. 2046-2049.*

* cited by examiner

*Primary Examiner*—David P Porta
*Assistant Examiner*—Marcus H Taningco
(74) *Attorney, Agent, or Firm*—Ingrassia Fisher & Lorenz, P.C.

(57) ABSTRACT

The disclosed system and apparatus for a sensor support structure generally includes a substantially reflective support strut having discontinuous protrusions on the support surface presented to the field of view of the sensor. These discontinuous protrusions may be suitably configured such that ambient thermal radiation is generally reflected away from the support strut and divergent from acceptance in the sensor's optical train.

20 Claims, 4 Drawing Sheets

SENSOR SYSTEM AND SUPPORT STRUCTURE

STATEMENT REGARDING GOVERNMENT FUNDING

This invention was developed in part as a result of funding provided by the United States Government; specifically, contract number N0002403C6111 "Standard Missile 3 (SM-3) Through Completion" with Naval Sea Systems Command. As a result of this funding, the United States Government has certain rights in this invention.

FIELD OF INVENTION

The present invention generally concerns sensor systems and their components. More particularly, representative and exemplary embodiments of the present invention generally relate to systems, devices and methods for providing structural support elements having substantially discontinuous protrusions facing a sensor array for the purpose of reducing thermal background noise.

BACKGROUND OF INVENTION

The ability of infrared sensor systems to image targets is often limited by thermal background noise resulting from self-emission of warm surfaces within the sensor's optical train. Secondary mirrors support struts, which are generally necessary in most centrally-obscured reflective optical systems, are often a source of thermal background noise. Because these struts are in the sensor's field-of-view, thermal emission from the struts tends to propagate down the optical path to the sensor.

Conventionally, struts have been painted black, which render them highly emissive, and therefore susceptible to contribute significantly to thermal background. Newer strut designs, however, generally employ highly reflective continuous stair step designs to view cold surfaces of the sensor system; for example, the sensor and the dewar portion of the sensor system.

While strut designs using a highly reflective continuous stair step design are more effective than painted black struts or purposes of viewing cold surfaces, there are sometimes multiple optical paths by which the sensor may observe thermal noise produced by the struts. These multiple pathways usually involve multiple reflections between the primary mirror, the strut surface facing the sensor, and the secondary mirror. Typically, the strut surface is not cooled and is generally disposed within the field of view of the image path. As a consequence, the strut surface may be substantially directly seen by the sensor, and reflections from the strut surface may cause the sensor to view warm parts of the system. Considerable thermal background noise may therefore be viewed. Accordingly, there exists a need for a strut design that overcomes these and other deficiencies of the prior art.

SUMMARY OF THE INVENTION

In various representative aspects, the present invention provides a design for a sensor support strut having substantially discontinuous protrusions on the structural surface of the strut present to the sensor's field of view. Advantages of the present invention will be set forth in the Detailed Description which follows and may be apparent from the Detailed Description or may be learned by practice of exemplary embodiments of the invention. Still other advantages of the invention may be realized by means of any of the instrumentalities, methods or combinations particularly pointed out in the claims.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the detailed description wherein:

Elements in the figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "fist", "second", and the like herein, if any, are used inter alia for distinguishing between similar elements and not necessarily for describing a sequential or chronological order. Moreover, the terms "front", "back", "top", "bottom", "over", "under", "forward", "aft", and the like in the description and/or in the claims, if any, are generally employed for descriptive purposes and not necessarily for comprehensively describing exclusive relative position. Any of the preceding terms so used may be interchanged under appropriate circumstances such that various embodiments of the invention described herein, for example, may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventors' conception of the best mode, and are not intended to limit the scope, applicability or configuration of the invention in any way. Rather, the following description is intended to provide convenient illustrations for implementing various embodiments of the invention. As will become apparent, changes may be made in the function and/or arrangement of any elements described in the disclosed exemplary embodiments without departing from the spirit and scope of the invention.

Various representative implementations of the present invention may applied to any sensor system. Certain representative implementations may include, for example: a strut having a plurality of discontinuous protrusions; the incorporation of a plurality of struts featuring discontinuous protrusions within a sensor system; the operation of a sensor system featuring struts having a plurality of discontinuous protrusions and/or the like.

A detailed description of an exemplary application, namely a support strut having a plurality of discontinuous protrusions and its application within a sensor system is provided as a specific enabling disclosure that may be generalized to any application of the disclosed system and method for reducing noise in a sensor system in accordance with various embodiments of the present invention.

Figure 1:
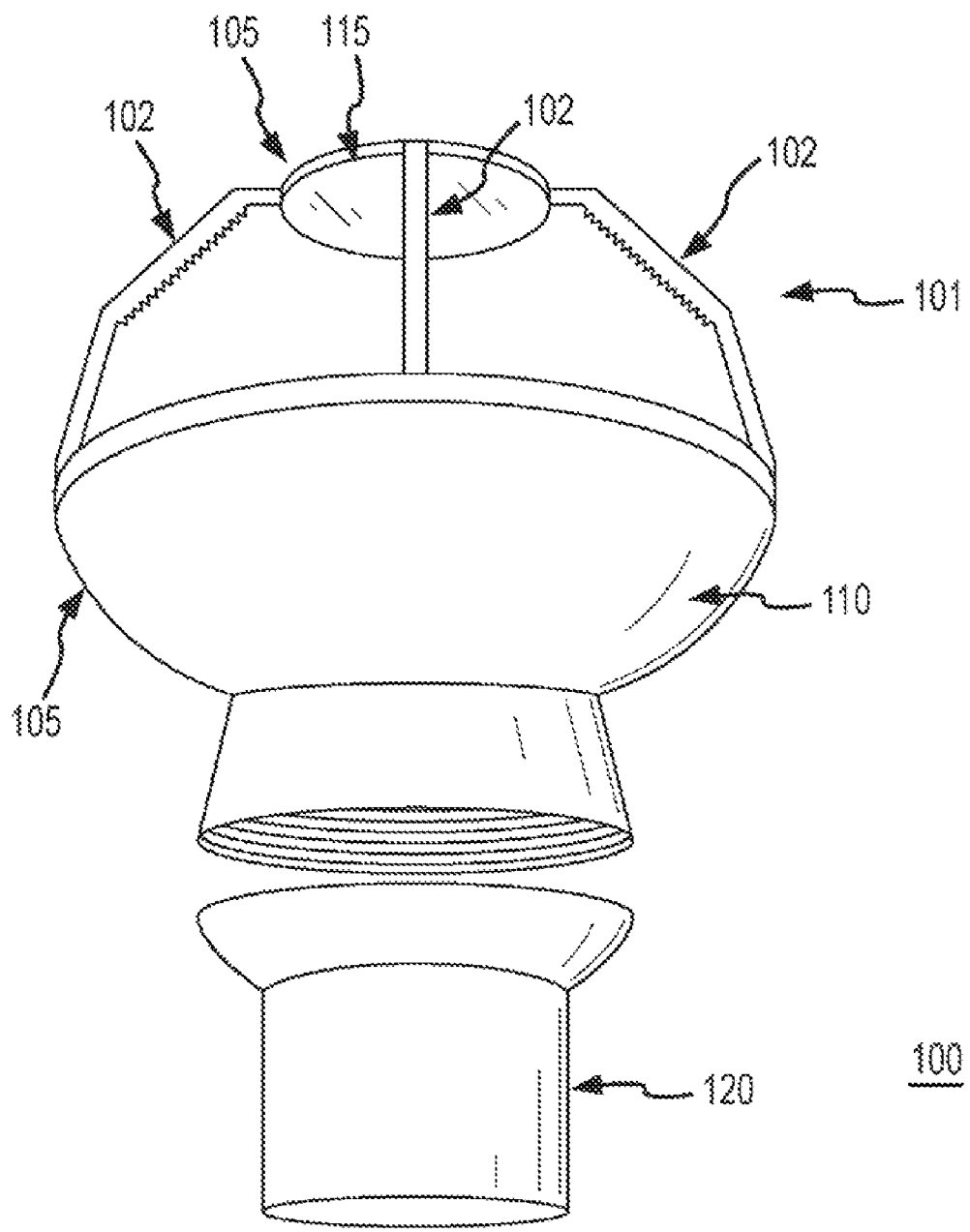
FIG. 1 representatively illustrates an isometric perspective view of a sensor system in accordance with an exemplary embodiment of the present invention.

FIG. 1 representatively illustrates an isometric perspective view of a sensor system 100 in accordance with an exemplary embodiment of the present invention. Sensor system 100 may be employed for any suitable purpose of application, such as observing remote or nearby targets, gathering information, tracking moving or stationary targets, and guiding systems toward targets. Sensor system 100 may receive relevant information relating to a particular condition, target, or other parameter, and may be suitably adapted to the particular application to sense or otherwise process relevant data. In various applications, sensor system 100 may sense any appropriate conditions or signals, for example movement, speed, acceleration, pressure, strain, heat, light, color, chemical composition, electromagnetic waves, magnetic fields, or any other type of physical event or presence capable of being sensed.

For example sensor system 100 may be integrated into a missile, which may include a payload, propulsion system, guidance system, and/or the like. Sensor system 100 may provide information to the guidance system to identify and/or predict the position of a target relative to the missile. The guidance system may receive information from sensor system 100 and process the information to control the flight path of the missile and intercept a target. Alternatively, sensor system 100 may be used in other applications and environments for sensing information, such as astronomy instruments, cameras, measuring instruments, and/or the like.

Sensor system 100 may comprise a sensor housing 120, a first mirror housing 110 and a second mirror housing 115. A support structure 101, which may comprise at least one strut 102, may couple the fist mirror housing 110 to the second mirror housing 115. The first mirror housing 110 and the second mirror housing 115 may comprise any appropriate components for the sensor system 100.

Each of first mirror housing 110 and second mirror housing 115 may comprise a dewar portion 105. In a representative embodiment, dewar portion 105 may comprise a portion of sensor system 100 that is cryogenically cooled to minimize thermal self-emission; for example, dewar portion 105 may comprise cooled surfaces that are at temperatures around 100K.

Figure 2:
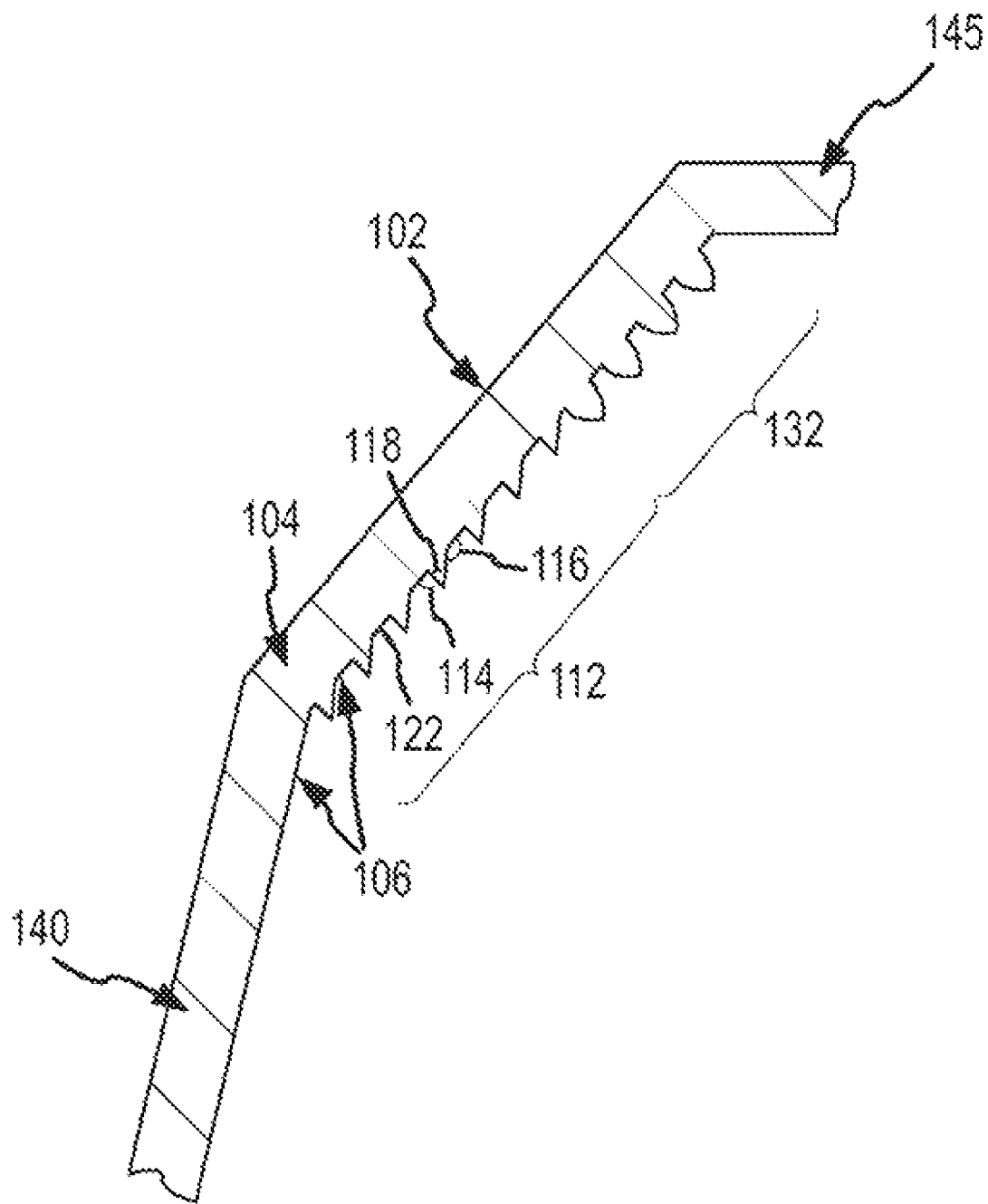
FIG. 2 representatively illustrates a cross section of a support strut having discontinuous protrusions in accordance with an exemplary embodiment of the present invention.

FIG. 2 representatively illustrates a cross-section of a strut 102 having discontinuous protrusions 112. Strut 102 may include any structure or apparatus that serves to secure first mirror housing 110 a distance from second mirror housing 115. Strut 102 may be coupled to the sensor system 100 at base end 140 and support end 145. This coupling may be by way of adhesive, fasteners, or from inclusion of the strut in a single piece which further includes additional elements. Strut 102 may comprise any suitable material, such as metal, ceramic, plastic, composite material or any combination thereof, and/or the like. In a representative and exemplary embodiment, strut 102 comprises a lightweight composite material for structural rigidity and low-weight. Composite materials may include any material comprised of more than one element wherein the multiple elements are not necessarily bound together in a covalent or ionic chemical bond, such as, for example: combinations of metals, fibers, organic materials, oxides, ceramics, and/or the like.

Strut 102 may be of any size, provided the geometries with respect to discontinuous protrusions 112 are maintained. Strut 102 may have a reflective surface on the outermost surface of the discontinuous protrusions 112 such that strut 102 is substantially reflective, where the reflective surface has an emissivity of less than unity. This reflective surface may result from an inherent property of the strut material or may be brought about as a result of coating the strut material with reflective materials. The reflective surface may also be fabricated by polishing an otherwise less reflective surface.

Strut 102 may be formed of two sides 104 connected to a common edge 106, where common edge 106 contains a plurality of substantially discontinuous protrusions 112. In an exemplary embodiment, two sides 104 may taper to form a common edge 106. In another embodiment, common edge 106 may comprise a surface that is substantially orthogonal to each of the two sides 104. Discontinuous protrusions 112 may be formed from surface geometries where an otherwise linear common edge 106 includes a jut (the jut extending from the otherwise linear common edge 106) and at least one of the angles defined by the junction of the jut and the otherwise linear common edge 106 is less than about 135 degrees. Each of discontinuous protrusions 112 may be separated by a substantially linear portion 122 of common edge 106. In a representative embodiment, a plurality of discontinuous protrusions 112 may be V-shaped, where the jut includes an acute angle at the region furthest from the otherwise linear portion 122 common edge 106 adjoining the jut.

Strut 102 may include a base end 140 directed toward first mirror housing 110 and a support end 145 directed toward second mirror housing 115. Each discontinuous protrusion 112 may include a base end angle 114 facing base end 140, a support end angle 116 facing support end 145 and a V-angle 118. In the representatively disclosed embodiment, the base end angle 114 of discontinuous protrusions 112 is about 90 degrees, the support end angle 116 of discontinuous protrusions 112 is about 135 degrees, and the V-angle 118 is about 45 degrees. Strut 102 is representatively illustrated with seven discontinuous protrusions 112 toward the base end 140. This is not limiting of the invention and any number of discontinuous protrusions 112 may be formed on common edge 106 and remain within the scope of the present invention.

Each of discontinuous protrusions 112 may be separated by a substantially linear portion 122 of common edge 106, rather than directly connected as in the continuous protrusions 132 located toward the support end 145. The combination of two sides forming base end angle 114 create a retro-reflector, which is a variation of a corner reflector. A retro-reflector is a device that sends light or other radiation back where it originates from regardless of the angle of incidence. A corner reflector is a retro-reflector consisting of three mutually perpendicular, intersecting flat surfaces, which reflects electromagnetic waves back towards the source, which is also known as a corner cube.

Figure 3:
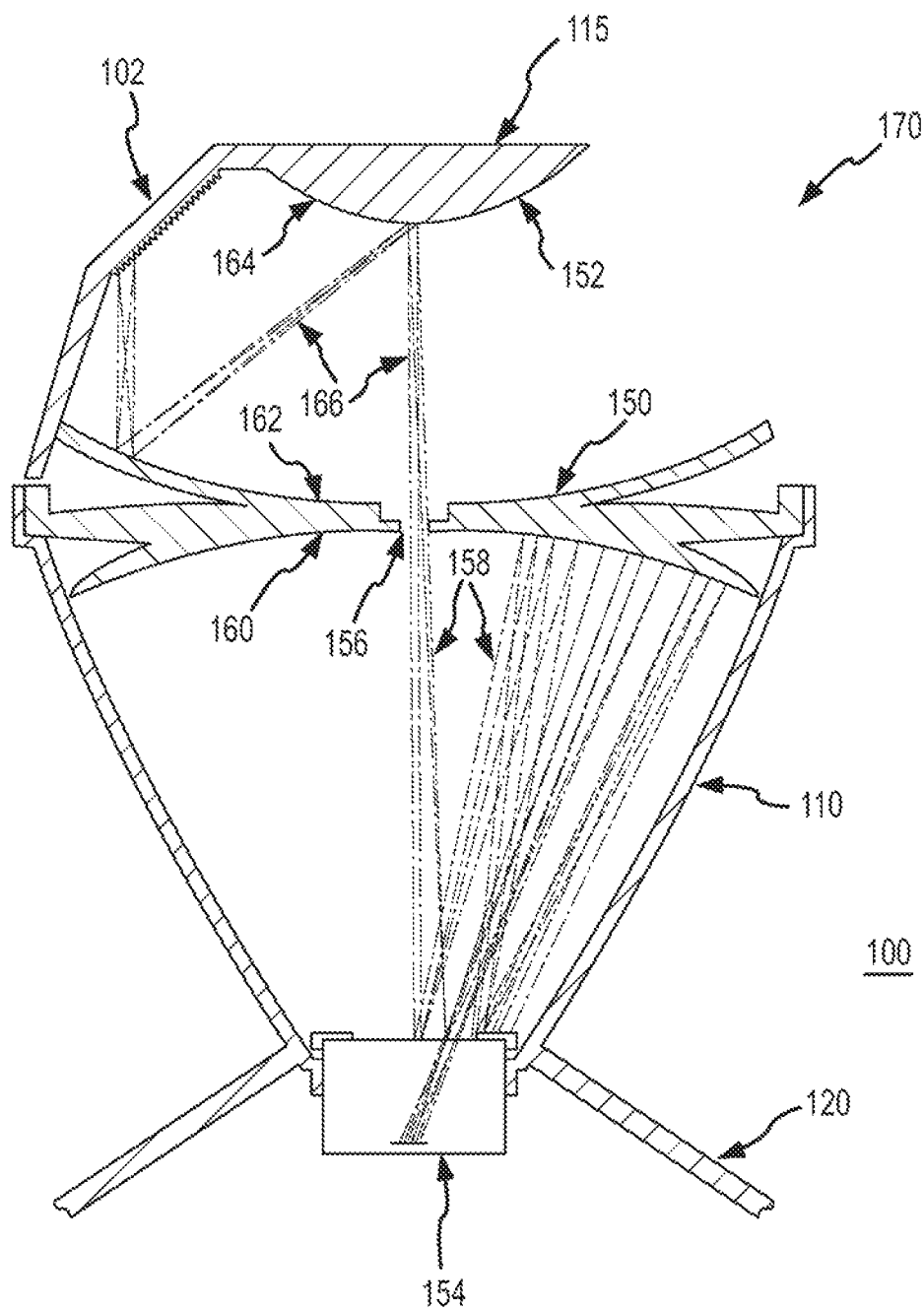
FIG. 3 representatively illustrates a cross sectional raytrace of a sensor system having support struts with discontinuous protrusions where retro-reflection is generally depicted via a nominal path, in accordance with an exemplary embodiment of the present invention.

FIG. 3 representatively illustrates a cross-sectional ray-trace of a sensor system 100 having struts 102 with discontinuous protrusions where retro-reflection is depicted via a nominal optical path 166. Sensor housing 120 may comprise a sensor 154, which may include any apparatus that is configured to detect electromagnetic radiation 158. In an exemplary embodiment, sensor 154 may comprise an infrared sensor, which may include any device that may be configured to respond to variations in infrared radiation, for example and without limitation, a radio telescope configured to be sensitive to infrared radiation, a light telescope configured to be sensitive to infrared radiation, and/or the like. In an exemplary embodiment, infrared sensor may comprise a focal plane array (FPA) or other suitable system for translating received infrared light into information, such as in the form of electrical or optical signals.

First mirror housing 110 may comprise a first mirror 150, and second mirror housing 115 may comprise a second mirror 152. First mirror 150 may be adapted to reflect incident light to secondary mirror 152, and secondary mirror 152 may be adapted to reflect light to sensor 154. First mirror 150 and second mirror 152 may comprise any suitable reflectors or array of reflectors adapted to reflect or otherwise transmit light to sensor 154. For example, first mirror 150 and second mirror 152 may comprise high-quality composite mirrors configured to reflect and focus infrared light.

First mirror housing 110 may be adapted, or otherwise suitably configured, to impede radiation which would otherwise be incident to the sensor 154 as between the first mirror 150 and the sensor 154 rather than by way of the second mirror 152. The first mirror housing 110 may be further adapted, or otherwise suitably configured, to hold the sensor housing 120 at a specified distance from the first mirror 150. Considerations such as temperature of use, the environment in which the device is to operate, and the precision with which the first mirror 150 and sensor 154 are to be separated will generally influence the choice of material for construction of the first mirror housing 110.

Second mirror housing 115 may be adapted, or otherwise suitably configured, to support the second mirror 152 with respect to the struts 102. In a representative embodiment, second mirror housing 115 and second mirror 152 may be constructed from a substantially unitary article of manufacture. Considerations such as temperature of use, the environment in which the device is to operate, and the precision with which the second mirror 152 and the struts 102 are to be coupled will generally influence the choice of material for construction of the second mirror housing 115.

The sensor housing 120 may be adapted, or otherwise suitably configured, to shield the sensor 154 from radiation not entering the optical train by way of the first mirror 150. The sensor housing 120 may further be adapted, or otherwise suitably configured, to hold the sensor 154 a specified distance from the first mirror housing 110. Considerations such as the environmental conditions of operation of the optical system will generally influence the choice of material for this component.

Sensor housing 120, first mirror housing 110 and second mirror housing 115 may be configured in any suitable configuration, and may comprise additional or fewer sensor, mirrors, and/or other components. First mirror 150 typically defines a sensor opening 156, where sensor 154 is positioned substantially below the sensor opening 156. Sensor 154 may be adapted to receive electromagnetic radiation 158 via an optical path 166 through sensor opening 156. Second mirror 152 may be positioned above sensor opening 156, where first mirror 150 focuses electromagnetic radiation 158 on second mirror 152, which in turn focuses electromagnetic radiation 158 on sensor 154. Thus, electromagnetic radiation 158 incident on first mirror 150 may be transmitted to sensor 154 along normal optical path 166.

Normal optical path 166 generally includes the line or lines defined by the focal point of the sensor system 100, the object being detected, and any reflections of the image of the object being detected as between the object being detected and the sensor system 100. Normal optical path 166 represents electromagnetic radiation 158 emitted internally by sensor system 100, which is typically reflected from within sensor system 100. The reflected radiation in such an embodiment may arise from internal self-emission of warm surfaces with the sensor's optical system. For example, such emissions may arise from struts 102 which are not cryogenically cooled to form dewar portion 105 as are other portions of sensor system 100 within first mirror housing 110 and second mirror housing 115.

First mirror 150 may comprise a sensor-side surface 160 which at least partially faces the sensor 154 and a first mirror surface 162, which at least partially faces the ambient environment 170. The second mirror 152 may comprise a second mirror surface 164 at least partially facing both the sensor 154 and the first mirror surface 162.

The plurality of discontinuous protrusions 112 of strut 102, having reflective surfaces, allows sensor 154 to view itself or the dewar portion 105 via retro-reflection from strut 102, thereby lowering the amount of undesired thermal emissions reaching sensor 154. Retro-reflections include those instances wherein incident radiation is reflected back in the direction of its source rather than in the direction of the sensor 154.

In a representative embodiment, thermal self-emission from sensor system 100 substantially reflected from the sensor 154 and the sensor-side surface 160 of the first mirror 150 is further reflected to the secondary mirror 152 and captured as between the discontinuous protrusions 112 of the struts 102 and the first mirror surface 162 of the first mirror 150 facing the struts 102 rather than escaping to the ambient environment 170. Likewise, any ambient radiation reflected from the discontinuous protrusions 112 of the struts 102 would be captured as between the strut 102 and the first mirror surface 162 of the first mirror 150 facing the struts 102 rather than being further reflected to the sensor 154. In effect, any electromagnetic radiation 158 reflected from discontinuous protrusion 112 of the strut are of either the sensor 154 or dewar portion 105, thereby lowering the thermal visibility of the struts 102 to the sensor 154.

Figure 4:
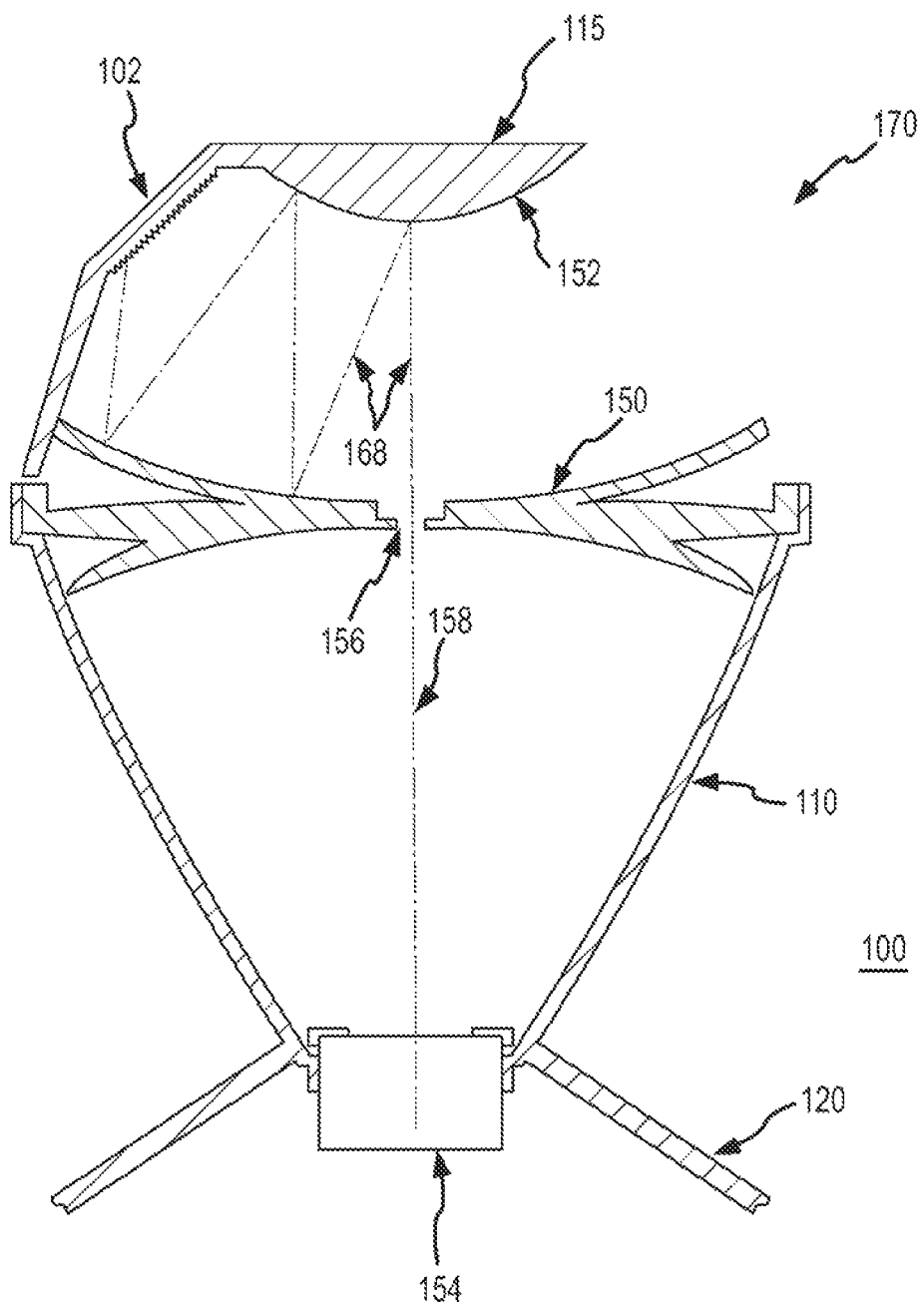
FIG. 4 representatively illustrates a cross sectional raytrace of a sensor system having support struts with discontinuous protrusions where reflection is generally depicted via a secondary path, in accordance with an exemplary embodiment of the present invention.

FIG. 4 representatively illustrates a cross-sectional ray-trace of a sensor system 100 having struts with discontinuous protrusions 112, where reflection is depicted via a secondary optical path 168. The secondary optical path 168 is that path at which reflections from the struts 102 reach the sensor 154 without being further reflected as between the sensor 154 and the sensor-side surface 160 of the first mirror 150. Note that as in FIG. 3, reflections reaching the strut 102 are not further returned to the ambient environment 170 via discontinuous protrusions 112. Likewise, ambient radiation will is not necessarily reflected from the strut 102 to the sensor 154.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage or solution to problem or any element that may cause any particular benefit, advantage or solution to occur or to become more pronounced are not to be construed as critical, required or essential features or components of any or all the claims.

As used herein, the terms "comprising", "having", "including", or any contextual variant thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. A support structure for reducing thermal noise in a sensor system, said support structure comprising a strut having at least one surface presented to the field of view of a sensor, wherein the strut surface comprises a plurality of discontinuous protrusions suitably adapted for diverting thermal radiation away from the sensor.

2. The support structure of claim 1, wherein the plurality of discontinuous protrusions are V-shaped.

3. The support structure of the claim 1, wherein the strut comprises a composite material.

4. The support structure of to claim 1, wherein at least one surface of the support strut comprises a substantially reflective surface.

5. The support structure of claim 1, wherein each of the plurality of discontinuous protrusions is separated by a substantially linear portion of a common edge.

6. The support structure of claim 1, wherein at least two sides of the support strut taper to form a common edge.

7. The support structure of claim 1, wherein a common edge is substantially orthogonal to at least two sides of the support strut.

8. A sensor system, comprising:
a sensor suitably adapted to receive electromagnetic radiation along an optical path; and
a support strut having at least one surface presented to the field of view of a sensor, wherein the strut surface comprises a plurality of discontinuous protrusions suitably configured to divert electromagnetic radiation away from the optical path of the sensor.

9. The sensor system of claim 8, wherein the sensor comprises an infrared sensor.

10. The sensor system of claim 8, wherein the strut comprises a composite material.

11. The sensor system of claim 8, wherein the plurality of discontinuous protrusions are V-shaped.

12. The sensor system of claim 8, wherein at least a portion of the plurality of said discontinuous protrusions have a substantially reflective surface.

13. The sensor system of claim 8, wherein the strut further comprises a plurality of substantially continuous protrusions.

14. A sensor system, comprising:
a first mirror defining a sensor opening;
a sensor substantially surrounded by the first mirror and adapted to receive electromagnetic radiation via an optical path through the sensor opening;
a second mirror adapted to reflect the electromagnetic radiation from the first mirror to the sensor; and
a strut coupling the first mirror to the second mirror, wherein the strut comprises a plurality of discontinuous protrusions at least partially exposed to the sensor via the optical path.

15. The sensor system of claim 14, wherein the sensor comprises an infrared sensor.

16. The sensor system of claim 14, wherein the strut comprises a composite material.

17. The sensor system of claim 14, wherein the plurality of discontinuous protrusions are V-shaped.

18. The sensor system of claim 14, wherein at least a portion of the plurality of discontinuous protrusions have a substantially reflective surface.

19. The sensor system of claim 14, wherein the sensor is configured to detect self-emissive noise via retro-reflections from the support strut.

20. The sensor system of claim 14, wherein the sensor is configured to detect a dewar portion of the sensor system via retro-reflections from the strut.

* * * * *